United States Patent [19]

Kunii et al.

[11] Patent Number: 5,586,224
[45] Date of Patent: Dec. 17, 1996

[54] ROBOT OR NUMERICAL CONTROL PROGRAMMING METHOD

[75] Inventors: Toshiyasu Kunii; Lining Sun, both of Tokyo, Japan

[73] Assignee: Shukyohojin, Kongo Zen Sohonzan Shorinji, Kagawa-ken, Japan

[21] Appl. No.: 172,704

[22] Filed: Dec. 27, 1993

Related U.S. Application Data

[63] Continuation-in-part of Ser. No. 712,885, Jun. 12, 1991, abandoned, and a continuation-in-part of Ser. No. 712,886, Jun. 12, 1991, abandoned.

[30] Foreign Application Priority Data

Dec. 25, 1990 [JP] Japan ................................ 2-418254
Dec. 25, 1990 [JP] Japan ................................ 2-418255

[51] Int. Cl.$^6$ .............................. A61B 5/11; G06F 15/46
[52] U.S. Cl. .................... 395/95; 395/96; 395/88; 395/92; 395/81
[58] Field of Search ...................... 395/95, 96, 88, 395/92, 81; 364/424.01; 318/568.1, 568.17; 901/1

[56] References Cited

U.S. PATENT DOCUMENTS

| | | | |
|---|---|---|---|
| 3,510,210 | 5/1970 | Von Haney | 395/152 |
| 4,603,284 | 7/1986 | Perzley | 395/95 |
| 4,621,332 | 11/1986 | Sugimoto et al. | 364/174 |
| 4,631,676 | 12/1986 | Pugh | 364/413 |
| 4,641,251 | 2/1987 | Inoue | 364/424 |
| 4,752,836 | 6/1988 | Blanton et al. | 395/152 |
| 4,819,184 | 4/1989 | Joensson et al. | 395/96 |
| 4,826,392 | 5/1989 | Hayati | 414/730 |

(List continued on next page.)

FOREIGN PATENT DOCUMENTS 0920687  2/1973  Canada ................................ 395/152

OTHER PUBLICATIONS

E. Popov, "Modern Robot Engineering", *ST Technology Series*, 1982.

Cramblitt, B. "Computers Capture Moments of Motion", *Computer Graphics World*, 12(3):50–57, 1989.

Phillips, C. B. et al "Interactive Real–time Articulated Figure Manipulation Using Multiple Kinematic Constraints", 1990 Symposium on Interactive 3D Graphics, *Computer Graphics*, 24(2):242–250, 1990.

Calvert, T.W. et al, "Composition of Multiple Figure Sequences for Dance and Animation", *Proceedings CG International '89*, pp. 245–254 (1989).

Nigel, W.J. et al, "Some Methods to Choreograph and Implement Motion in Computer Animation", *Proceedings of Computer Animation '89*, 125–140 (1989).

(List continued on next page.)

*Primary Examiner*—George B. Davis
*Attorney, Agent, or Firm*—Browdy and Neimark

[57] ABSTRACT

A method for programming a robot or forming a numerical control program for a machine tool comprises analyzing the actual motions of a human being and designing a new motion based on knowledge obtained by analysis of the forces and torques acting on the joints of the human body. A robot body or machine tool is divided into a plurality of independent elements, and the motion of each element, when a force corresponding to a basic motion of a human being is exerted thereon, is calculated using dynamics. Constraints including the articulation of the robot body or machine tool and the range of movements of its joints are applied to the robot body or machine tool. Forces corresponding to motions produced by the application of constraints are calculated by inverse dynamics. The motions of and forces acting on the elements of the robot body or machine tool are displayed on a screen.

10 Claims, 4 Drawing Sheets

U.S. PATENT DOCUMENTS

| | | | |
|---|---|---|---|
| 4,834,057 | 5/1989 | McLeod, Jr. | 128/782 |
| 4,851,748 | 7/1989 | Daggett et al. | 395/95 |
| 4,868,474 | 9/1989 | Lancraft et al. | 395/86 |
| 4,891,748 | 1/1990 | Mann | 364/410 |
| 4,925,312 | 5/1990 | Onaga et al. | 395/95 |
| 4,974,210 | 11/1990 | Lee | 395/95 |
| 5,025,394 | 6/1991 | Parke | 395/152 |
| 5,090,042 | 2/1992 | Bejjami et al. | 378/99 |
| 5,099,859 | 5/1992 | Bell | 128/781 |
| 5,111,410 | 5/1992 | Nakayama et al. | 364/551.01 |
| 5,120,228 | 6/1992 | Stahl et al. | 434/258 |
| 5,151,859 | 9/1992 | Yoshino et al. | 364/424.01 |
| 5,159,988 | 12/1992 | Gomi et al. | 901/1 |
| 5,184,295 | 2/1993 | Mann | 364/410 |
| 5,187,796 | 2/1993 | Wang et al. | 395/800 |
| 5,255,753 | 10/1993 | Nishikawa et al. | 901/1 |

OTHER PUBLICATIONS

Wilhelms, J.P. et al, "Using Dynamic Analysis to Animate Articulated Bodies such as Humans and Robots", in N. Magnenat–Thalmann et al (eds), *Computer–Generated Images,* Springer Verlag, Tokyo, pp. 209–229 (1985).

Sun, L. et al, "An Architectural Design of a Sports Instruction System", *First International Conference and Exhibition on Visual Computing for Defense and Government* (VISUDA '89), Paris, France (1989) (Technical Report 89–017).

D.I. Miller, "Computer Simulation of Human Motion", in D.W. Grieve et al (eds), *Techniques for the Analysis of Human Motion,* Lepus Books, London, 1975.

Armstrong W.W. et al, "The Dynamics of Articulated Rigid Bodies for Purposes of Animation", *The Visual Computer,* 1:231–240 (1985).

Barzel et al, "A Modeling System Based on Dynamic Constraints", Computer Graphics, vol. 22, No. 4, Aug. 1988.

ROBOT OR NUMERICAL CONTROL PROGRAMMING METHOD

CROSS-REFERENCE TO RELATED APPLICATIONS

The present application is a continuation-in-part of both U.S. application Ser. No. 07/712,885, filed Jun. 12, 1991, now abandoned, and U.S. application Ser. No. 07/712,886, filed Jun. 12, 1991, now abandoned. The present invention is also related to co-pending applications Ser. No. 07/712,884, 07/714,304 and 07/714,306, all filed Jun. 12, 1991, and 08/139,703, filed Oct. 5, 1993.

BACKGROUND OF THE INVENTION

The present invention relates to a method for programming a robot to imitate the motions of a human being or animal under the control of a computer. The present invention further relates to a method for producing a numerical control program for driving a machine tool or similar device in a manner which imitates the motions of a human machine operator.

Recently, industrial robots have come to be used in various fields to perform a wide variety of physical motions which simulate the motions of human beings. Programming a robot involves a process known as teaching. One teaching method is an on-line programming method known as "teaching playback" in which the motions of a human being are directly taught to the robot. Another method is an off-line programming method in which the motions of a human being are simulated by a computer.

In the teaching playback method, a person moves a robot in accordance with a working sequence by manual control. This method is widely adopted because it is easy to perform, but it has a disadvantage in that the operation of the robot must be stopped during the teaching process, thereby lowering the working efficiency of the robot. The off-line programming method is useful when a high working efficiency is required, because the programming can be performed without stopping operation of the robot.

Generally, in the off-line programming method, the contents of tracks and movements scheduled by environmental models are described by a robot programming language. The contents are ascertained by motion simulation and fine adjustment of the contents is later performed at the work site. Thus, the off-line programming method is very complicated. Since the environmental models include geometrical information such as configuration, dimensions, positions, and postures of the workpiece and peripheral equipment, physical parameters such as materials and weights, and technical information such as functions, service and usage, a programmer must schedule the working sequence by using complex environmental models.

Modern machine tools are frequently controlled by numerical control programs. Recently, in numerical control techniques, systems known as computer-aided engineering (CAE) systems or computer-integrated manufacturing (CIM) systems have been utilized. In these system, design is performed using computer-aided design (CAD) processes and production is performed using computer-aided manufacturing (CAM) processes.

Since numerical control techniques do not specify working requirements, such as the direction of the working operation, the magnitude of the force to be applied to the workpiece, or the working speed, it is impossible with these techniques to achieve the same quality as can be achieved by a skilled craftsman manually controlling a machine tool.

Furthermore, while the formation of numerical control programs is preferably performed by a method having real time response, conventional numerical control programming methods have no real time response because they require the ascertainment of the contents by means of motion simulation and fine adjustment at the work site.

In order to perform high quality manufacturing by means of numerical control, it is necessary to analyze the motions of a human machine operator and form a control program on the basis of the analysis. In order to control a robot to perform the motions of a human being, it is necessary to analyze the motions of a human being and then design motions to be performed by the robot. For both robots and numerical control programs, the motions of an object are observed by a motion analyst and then on the basis of his observations, a curriculum or a program for teaching or producing the same motions is formed. However, because observations are subjective, often based on the intuition of the programmer, they may not give accurate results.

There has recently been proposed a technique wherein the motions of a human being or an animal are analyzed using a computer. See D. I. Miller, "Computer Simulation of Human Motion", in D. W. Grieve et al, (eds), *Techniques for the Analysis of Human Motion*, Lepus Books, London, 1975; Calvert T. W. et al, "Composition of Multiple Figure Sequences for Dance and Animation", Proceedings CG International '89, pp. 245–254 (1989); Nigel W. J. et al, "Some Methods to Choreograph and Implement Motion in Computer Animation", *Proceedings of Computer Animation '89*, 125–140 (1989). In analyzing using computer, a motion analyst analyzes the motions depending on his understanding by applying kinematics, which describes the motions only in terms of positions, velocities and accelerations, neglecting the forces and torques responsible. Thus, kinematics analysis can only generate a line picture representing parts constituting a human or animal body, and a three-dimensional model of the human or animal body cannot be displayed realistically on a screen. Accordingly, the motions designed may be unreasonable and also it is difficult to develop a new motion. The same is true when using kinematics to analyze and design the motion of a machine tool. Thus, as with robotic motion, it was difficult to construct a numerical control program using only a computer.

Another method uses dynamics. While kinematics provides motion analysis in terms of positions, velocities and accelerations, dynamics provides the motions of objects based on the relation between movements and forces. If dynamics is applied to the computer analysis of motions, it is possible to generate complex behavior with the analyst's minimal control. However, the computer analysis of motions utilizing dynamics requires data such as the moments of inertia, the centers of gravity, joint friction and muscle/ligament elasticity of the object, which are difficult to measure. Without such data, the computer analysis of motions utilizing dynamics provides unreasonable results similar to the case of using kinematics. Furthermore, it is necessary to solve rather complex dynamics equations. For a human body, an articulated body with 200 degrees of freedom, it is necessary to solve 600 simultaneous differential equations.

In order to display the motions on a screen, the dynamics equations must be solved exactly. Since this method has the computation complexity $O(n)^4$, a function of $n^4$, where n is the number of segments constituting a human body and forming the minimal units of motion in the motion analysis, large amounts of computations are required and thus takes time and are expensive. Thus, dynamical simulation methods such as that disclosed in Wilhelms J. P. et al., "Using Dynamic Analysis to Animate Articulated Bodies such as Humans and Robots", *Proceedings, Graphics Interface '85*, 97–104 (1985) have not been accepted, mostly because of its conceptual complexity and computational expensiveness.

A motion analyzing method which reduces the computation complexity to O(n), a function of n, enabled by neglecting rotations about the principal axes, has been proposed. Armstrong W. W. et al, "The Dynamics of Articulated Rigid Bodies for Purposes of Animation", *The Visual Computer*, 1:231–240 (1985). However, when the rotations of joints about the principal axes cannot be neglected, this method is not applicable. Thus, by using this method, the forces that produce a motion or the forces that are produced by a motion cannot be displayed exactly.

In a publication from the department of the present inventors, Sun, L. et al., "An Architectural Design of a Sports Instruction System", *First International Conference and Exhibition on Visual Computing for Defense and Government* (VISUDA '89), Paris, France (1989) (Technical Report 89–017), a system for inputting and analyzing human body movement is disclosed. The human body is modeled as a set of articulated segments, each of which is essentially a rigid solid. In this model, the human body is represented by 50 segments. The system takes in a set of measurements taken with an actual human body and converts it into the size data for each segment, e.g., length, width and diameter. When displaying the model, the system approximates each segment with a polygon and performs a smooth shading for better appearance. In addition, the system calculates the center of gravity and the mass for each segment which will be required in the analysis. A video recorder, preferably several video recorders, recording the movement from a plurality of points of view, records the motion of actual humans in a time sequence of video frames. The position of objects in each frame is input to the system to reproduce and analyze the movement. In order to define the position and configuration of the body in space, the position and orientation of each segment are specified. Therefore, for each segment there are six degrees of freedom, three for the position and three for the orientation. Each segment in an articulate body, however, is restricted by attachments to neighboring segments. Therefore, it suffices to specify the position of only one segment (orientation must be specified for all segments), thereby reducing the degrees of freedom considerably. The user specifies the position of each body segment by manipulating this figure using a mouse; the user picks a segment and translates and or rotates it so that the displayed figure assumes the position of the figure on the videotape. The image of a video frame can be superimposed on each window to facilitate this process.

The body movement which has been input into the computer is then analyzed considering two factors: the movement of the center of gravity and the force exerted on each segment of the body. The position vector G of the center of gravity of a human body is computed by the following formulation:

$$G = \frac{\Sigma g_i \Delta m_i}{\Sigma \Delta m_i}$$

where $g_i$ is the position vector of the center of gravity of a segment i and $\Delta m_i$. Since each segment is assumed to be a uniform rigid body, $g_i$ and $\Delta m_i$ can be obtained prior to this calculation from the measurement data.

The center of gravity of each segment is computed in a way similar to the above formulation. Each segment is divided into small wedge-shaped volumes around and along the central axis through the segment, and these volumes are summed up to find the position of the center of gravity.

The problem of computing the force exerted on a human body from its movement is a problem of inverse dynamics. One starts with the sequence of positions and obtains the velocity and the acceleration of each part of the body, from which the force that has caused such motion is to be calculated.

Solving a problem of dynamics is essentially solving differential equations which describe the relationship between mass and force and torque applied to it. A variety of formulations are available for describing the dynamics equation. They all produce the same result expressed in slightly different terms. One of the most familiar formulations is Lagrange's equation:

$$\frac{\partial L}{\partial q_i} - \frac{d}{dt} \frac{\partial L}{\partial \dot{q}_i} + \lambda \frac{\partial f}{\partial q_i} + Q_i = 0$$

where L is the Lagrangian given by kinetic energy (T) minus potential energy (P), $q_i$ is the ith coordinate, f is a constraint equation, $\lambda$ is an undetermined multiplier, and $Q_i$ is the force or torque applied to the ith coordinate.

In a general animation system, the dynamics approach is not yet practical due to the high computational complexity and cost required. The articulated body of the Sun publication model, consisting of 50 segments, requires 300 (=50×6) simultaneous equations to describe it. However, the use of known forces, such as the reactive force between a foot and a floor, simplifies the situation. For each segment, we have $$L = \frac{1}{2} m V_g (X_a, X_b, \dot{X}_a, \dot{X}_b)^2 +$$
$$\quad \frac{1}{2} I \omega_g (X_a, X_b, \dot{X}_a, \dot{X}_b)^2 - P(X_a, X_b)$$
$$= L(X_a, X_b, \dot{X}_a, \dot{X}_b)$$
$$f = |X_a - X_b| - l$$
$$= f(X_a, X_b)$$

where m is the mass of the segment, $V_g$ is the velocity vector of the center of gravity, $X_a$ and $X_d$ are the position vectors of its two ends, a and b, $\dot{X}_a$ and $\dot{X}_b$ are the velocity vectors, I is the inertia tensor, $\omega_g$ is the angular velocity vector around the center of gravity, and l is the distance between two ends.

Sun proposes letting the left side of the above Lagrange's equation be D. Then, $$D(X_a, X_b, \dot{X}_a, \dot{X}_b, \lambda, F_a, F_b) = 0$$

where $F_a$ and $F_b$ are the forces exerted on a and b, respectively. Each segment has six degrees of freedom, and there are six degrees of freedom, and there are six Lagrange's equations describing it. In the above Lagrange's equations $D(X_a, X_b, \dot{X}_a, \dot{X}_b, \lambda, F_a, F_b)$, the three components of $F_a(x,y,z)$ and $F_b(x,y,z)$, and $\lambda$ are unknown. Therefore, there are seven unknown variables in total in the the system of six equations. If the force in one direction can be obtained through some means (e.g. by measurement), $\lambda$ and five other force components can be computed by solving these equations.

Sun then supposes that a segment i is connected at an end $b_1$ to an end $a_j$ of another segment j. By Newton's Third Law of Motion, the force exerted on the segment i at $b_i$ is equal and opposite to the force exerted on the segment j at $a_3$. By solving the equations for the segment i, one also obtains a partial solution (three of the seven unknown variables) for the segment j as well. By repeating this process, solutions can be found for all segments making up the body.

As the starting point of a series of calculations, Sun suggests using the force exerted on a foot by the floor, which was measured in advance, to calculate the force exerted on the joint of the foot and shin. Then one works upward to head and lower arms through shins, thighs, hip, waist and torso. In the end, one has calculated the force exerted on each segment at its ends. Note that the force calculated here is the sum of internal force and external force. Internal force is exerted by muscles on attached joints. For the segments on which no external force is exerted, the result is equal to just the internal force. On the other hand, for the segments with no internal force, the result is equal to the external force.

While this system of inputting and analyzing human body movement is useful for computerizing the dynamics of videotaped human movement, it does not solve the problem of how to control an industrial robot or machine tool in a manner which simulates the motion of a human body as closely as possible without relying on trial and error or an unworkable magnitude of calculations.

SUMMARY OF THE INVENTION

It is an object of the present invention to provide an improved robot programming method, or an improved method for forming a numerical control program, which can develop new motions for a machine tool, using knowledge obtained by dynamic analysis of the motions of a human being, to thereby program complicated working sequences.

It is another object of the present invention to provide an improved robot programming method or an improved method for forming a numerical control program which enables a programmer to develop a new motion in an interactive manner without relying on trial and error or the intuition of the programmer.

In the method according to the present invention, an improved method for forming a numerical control program by computer in an interactive manner without relying on trial and error or the intuition of the programmer.

In a method for forming a numerical control program according to the present invention, basic motions of a human being are analyzed to obtain data on dynamic parameters including the forces and torque exerted on joints of the human body, and this data is put into a database. A programmer then accesses the database and modifies the data, and a computer provides the programmer with feedback in real time on the result of constraints in terms of constrained motions and the result of inverse dynamics in terms of forces. The programmer can design new motions in an interactive manner by repeating the above processes until satisfactory results are obtained.

The computational complexity of the method of the present invention is a function O(n) of the number of segments n, so the computational complexity is much less than with conventional programming methods. Furthermore, the present invention can produce natural motion of a robot or a machine tool.

DETAILED DESCRIPTION OF THE PREFERRED EMBODIMENTS

A preferred embodiment of the present invention will now be described with reference to the drawings.

Figure 1:
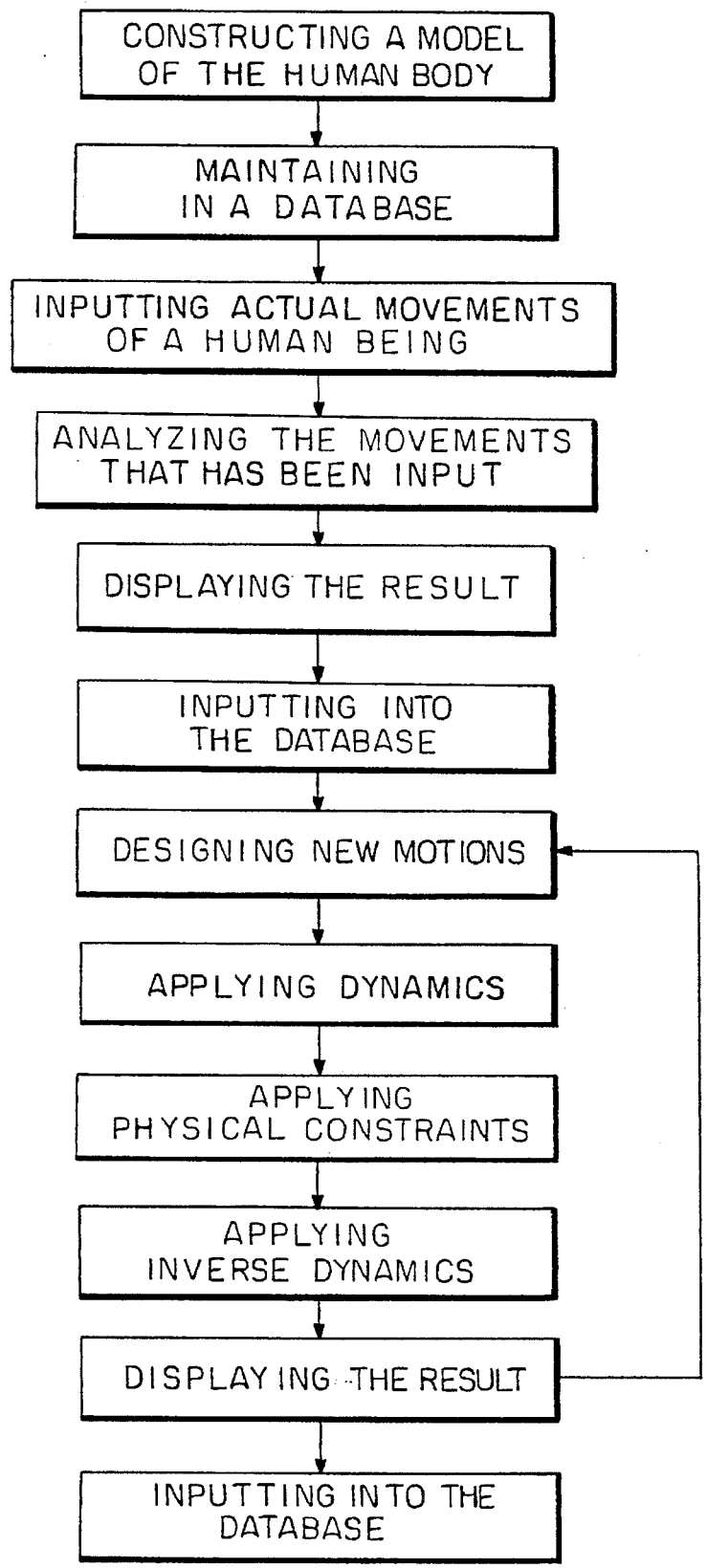
FIG. 1 is a flow chart of an embodiment according to this invention.

FIG. 1 shows a flow chart of one embodiment according to this invention, including following steps:

1. Constructing a model of a human body;
2. Maintaining a database;
3. Inputting actual movements of a human being;
4. Analyzing the movements that have been input;
5. Displaying the results;
6. Inputting the results into the database;
7. Designing new motions;
8. Applying dynamics;
9. Applying physical constraints;
10. Applying inverse dynamics;
11. Displaying the result;
12. Maintaining the result in a database.

Figure 2:
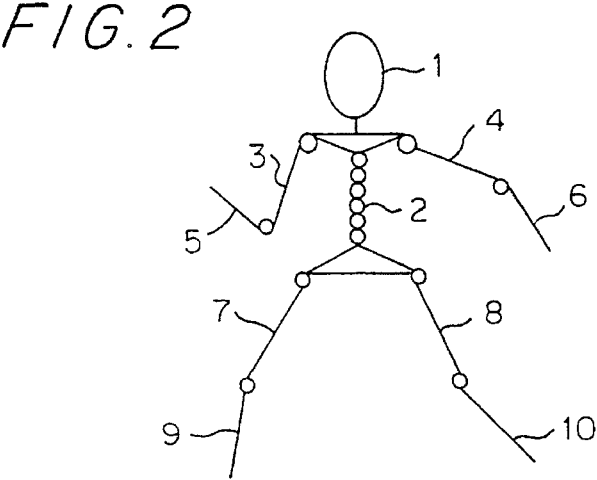
FIG. 2 is a schematic view showing structure of a model of a human body.

In the first step (constructing a model), the human body is divided into a plurality of segments connected by body joints, each of the segments acting as a minimal unit of motion, as shown in FIG. 2. A human body model then is constructed on the basis of the inherent nature of each of the segments and physical constraints such as the inter-relationship of each segment and the range of movements of the joints connecting the segments.

As shown in FIG. 2, the human body consists of parts, roughly divided, a head 1 a trunk 2 and four limbs, and each part is connected with the trunk 2 placed in the center of them. Upper limbs comprising of right and left arms consist of upperarms 3, 4, forearms 5, 6, and hands, respectively; each hand having five fingers, having a plurality of segments connected by joints (not shown). Lower limbs comprising of right and left legs also consist of 7, 8, 9 and 10 in like manner.

In this figure, the bones constructing the human body appear as lines, and the joints by which the bones are connected to each other appear as small circles. As shown in the figure, the bones described by lines are minimal units of motion which will not be divided further, and the joints described by small circles determine the mutual relationship of the bones.

The nature of these joints and bones constructing the human body; that is, interconnecting relationship on each of the segments and ranges of the movement of each joint are physical constraints. Data defining the model is stored in the computer on a database.

In the third step (inputting actual movements), a film is taken of the actual motions of a human body, and for each frame of the film or of the video film, the positions of the body parts of the human being are input to the computer for the modeling. When the human body is simultaneously filmed from a plurality of directions, the analysis in the next step can be executed more concretely. This is all as described in Sun et al (supra).

In the fourth step (analyzing the movements that have been input), the data as to motions input in the second step are calculated by inverse dynamics using Lagrange's equation which describe the relationship of forces and movements, to be analyzed. The center of gravity of each of the body segments, the force and torque exerted on each joint, the position of the center of gravity of the whole body and the forces and torques exerted on the centers of gravity are all calculated and then input into the database.

In the fifth step (displaying the result), the center of gravity of each of the body segments, the force and torque exerted on each joint, the position of the center of gravity of the whole body, and the forces and torques exerted on the centers of gravity, resulting from the fourth step, are displayed by symbols such as arrows on a screen.

Figure 4A:
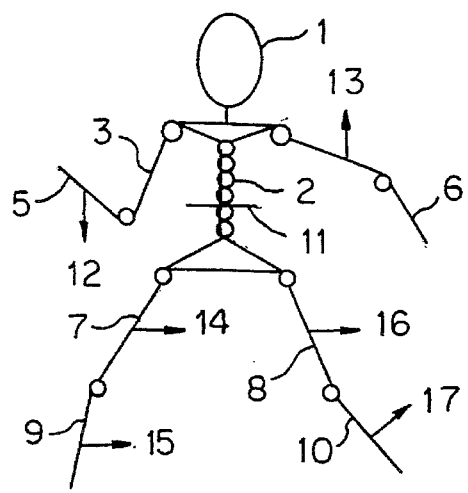
FIGS. 4(a) and 4(b) are views showing one example displaying on a screen a result of motion analysis according to this invention.
Figure 4B:
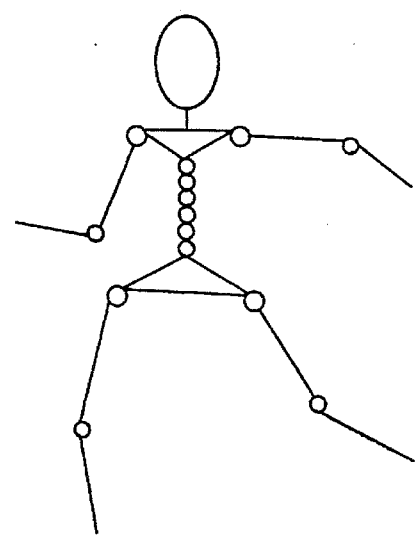

In FIG. 4(a), a cross symbol, 11 showing the center of gravity of the whole body and arrow symbols, 12–17 showing the vector of the forces exerted on each center of gravity of each segment, are displayed superimposed on the human body model of the database, when the human body model in FIG. 4(a) comes to that in the state of FIG. 4(b). This display describes forces exerted on the right forearm segment 5 as vector 12, on the left upperarm segment 4 as vector 13, on the right thigh segment 7 as vector 14, on the right leg segment 9 as vector 15, on the left thigh segment as vector 16, and on the left leg segment 10 as vector 17.

Figure 5:
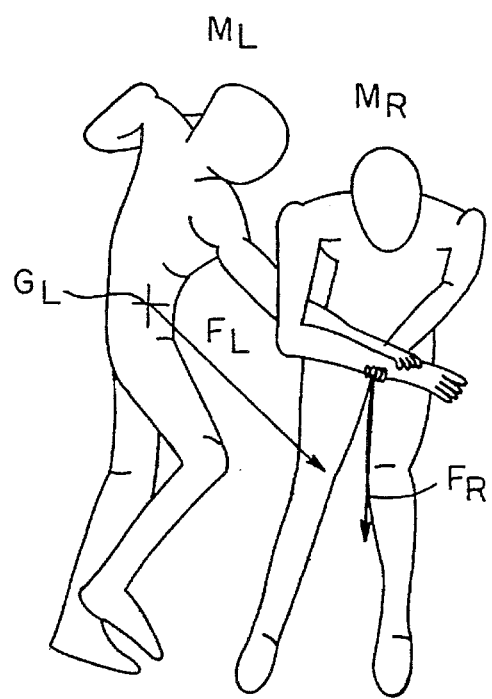
FIG. 5 is a view showing another example displayed a result of motion analyzing on a screen according to this invention.

FIG. 5 shows a display of an example of performing a skill by two persons in Shorinji Kempo, in which positions of the centers of gravity of the bodies and the forces exerted are superimposed on the model of the filmed human bodies. In this figure, the person MR on the right side seizes the right wrist of the person ML on the left side and acts the force shown as an arrow FR to the right arm of ML and, therefore, produces the force shown as another arrow FL onto the center of gravity GL of the whole body of ML. Accordingly, the display can show motions more concretely to be understood easily by anyone.

According to this invention, motions to be analyzed are calculated, on the basis of physical constraints and the inherent nature of each segment acting as the minimal unit of movements of a human or an animal body which are put into a database, and the motion and the center of gravity of each of the segments and the force and torque exerted on each joint, the motion and the center of gravity of the whole body, and the forces and torques exerted on the centers of gravity are obtained. The results obtained are, therefore, reasonable and realistic, and the motions are easily understood by arrows showing directions of movements or forces appearing on the human body model on the screen.

In these steps, the motion analysis of this invention is carried out.

Figure 3:
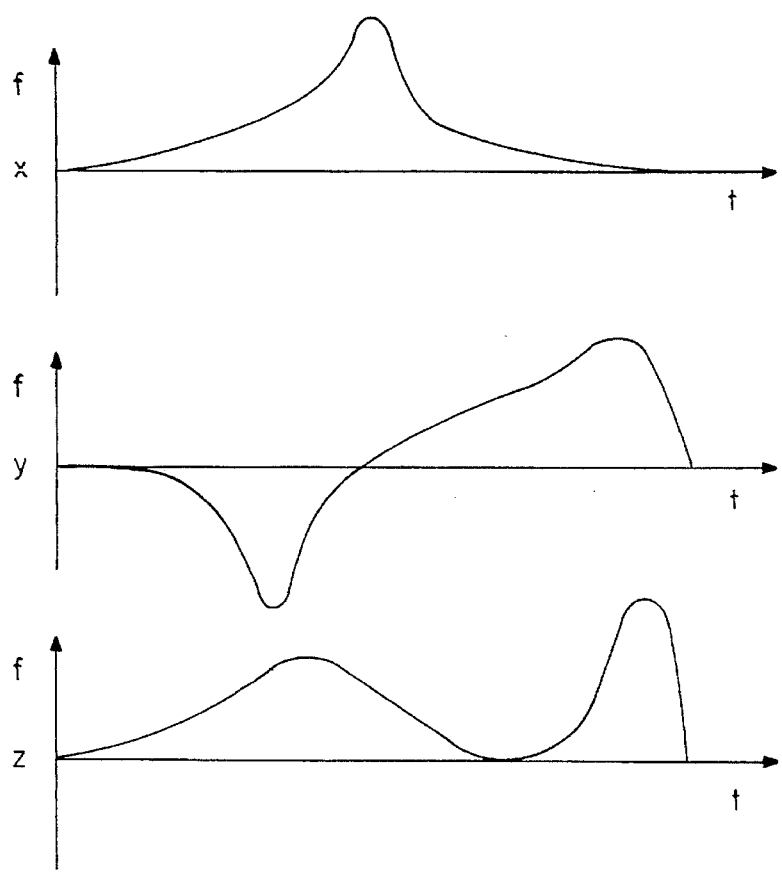
FIG. 3 is a control graph showing an example of the forces exerted on a segment joint of a human body.

In the sixth step (inputting into the database), the resulting analysis is input into the database to be used further for developing new motions. One way of quantitatively representing the motions is by means of control graphs showing the forces acting on one of the joints of the model as a function of time. FIG. 3 is an example of a control graph of the forces acting on the left elbow of a golfer in the directions of x, y, and z orthogonal axes as a function of time. The data constituting the control graphs are determined from the motions of the model obtained after applying actual motions to the model and analyzing the results, and are stored in the database. Since the two forces exerted on any given joint are equal in magnitude and opposite in direction, this constraint must be maintained by the system. A complicated motion is represented by a plurality of graphs. For example, the control graphs of a human being standing up from a chair and walking constitute a continuous composite motion. Each control graph for active segments is designed in the same manner as for the illustrated control graphs for the left elbow.

On the basis of the data input into the database, and particularly the control graphs showing all of the forces on each joint over time as the model goes through a particular motion or activity, it is possible to design new motions (the seventh step of the flow chart). Thus, the movement of a robot may be programmed or a numerical control program for working a machine tool may be created starting with the information which is already available in the database.

Motions are designed at two levels: changing the speed of the motions and the forces causing the motions, and composing a complicated motion from the basic motions.

At first, the user chooses the basic motions from the database. Then, the dynamics parameters of the motions chosen are displayed using a two dimensional control graph, where the abscissa represents time and the ordinate represents the forces exerted on each joint of the body (FIG. 2). Since the two forces exerted on the same joint must be equal in magnitude and opposite in direction, this constraint must be maintained by the system. The user may be provided with various facilities to modify these physical parameters using a mouse.

To facilitate the modification, two control modes are supported:

1. The global modification: The same changes of the forces are caused to all the human body parts on which the forces are exerted. This modification can involve scaling up or down of the x– or y-axis.

2. The local modification: It changes only the force exerted on a specific part of the body.

Another modification other than the motion is the modification of the acceleration due to gravity, which is necessary when simulating motion outside the earth.

The joint limits restrict the range of the joint movements, because the joints of a real human body cannot rotate arbitrarily in all directions. The limits are the constants of a given human body, which have been put into the database.

A complicated motion is represented by several control graphs, each of which is designed by the user by the same method. For example, the control graphs of somebody standing up from a chair and walking constitute a continuous composite motion. In case of Shorinji Kempo, a Japanese martial art, any kind of motion is based on 12 basic control graphs.

In the eighth step (application of dynamics), the motion of each segment of the robot or each element of the machine tool is calculated on the basis of the forces corresponding to the basic motions selected by the developer and dynamic equations governing movement of each segment. Although the segments of the robot body or elements of the machine tool are actually connected with one another by joints, in order to simplify the calculations, it is assumed for the moment that each element is independent of the other elements.

Figure 6A:
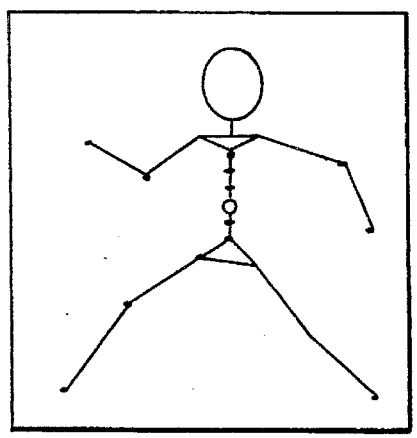
FIGS. 6(a) and 6(b) are views showing the results of the dynamics step in which body segments are identified and each segment is calculated independently, neglecting joint constraints, FIG. 6(a) being before the application of the dynamics step and FIG. 6(b) being thereafter.
Figure 6B:
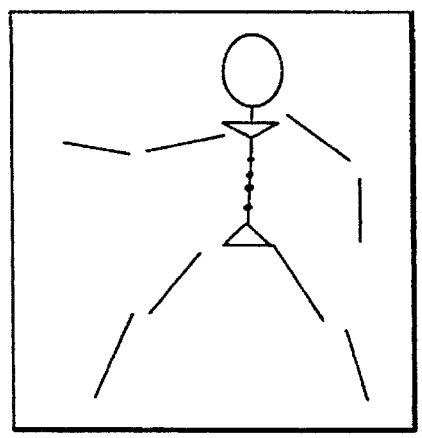

Dynamics calculates the path of each body segment independently of the rest, based on the forces specified by the user and the dynamics equations governing the segment movements. In this calculation, each body segment is firstly distinguished (FIG. 6(a) and 6(b)), and the articulation of the human body and the constraints regarding the range of the movements of joints are neglected for the present. The idea is to reduce the amount of computation. The results of calculation of the motions of every segment are passed to the next step, where the physical constraints of the body are checked and enforced.

For each segment, the Newton-Euler formulation is used to calculate the motion. Newton's equation is used to derive the linear acceleration of the center of gravity as follows:

$F_x = m\ddot{p}_x$ $F_y = m(\ddot{p}_y - g)$ $F_z = m\ddot{p}_z$ where

F is the force exerted on the segment, m is the mass of the segment,

ρ is the position of the center of gravity of the segment, and g is the acceleration of gravity.

Euler's equation is used to derive the angular acceleration about its center of gravity as follows:

$N_x = I_x \dot{\omega}_x + (I_y - I_z)\omega_y \omega_z$ $N_y = I_y \dot{\omega}_y + (I_z - I_x)\omega_x \omega_y$ $N_z = I_z \dot{\omega}_z + (I_x - I_y)\omega_x \omega_y$ where x,y,z are the directions of the principal axes, N is the external torque being applied to the segment, I is the principal moments of inertia, and ω is the angular velocity of the segment.

Note that the principal moments of inertia are the diagonal elements when the inertia tensor is diagonalized, which are derived from the eigen values of the inertia tensor of the segment. And the corresponding principal axes are obtained from its eigen vector equations. Thus, before solving Euler's equation, the original coordinates must be transformed to the principal axes. The Euler angles can be used to perform the transformations.

Once new linear and angular accelerations are obtained, they must be integrated to find new velocities and integrated again to find new positions.

The Euler method is simplest to do this.

$v_{t+\delta t} = v_t + a_t \delta t$ $p_{t+\delta t} = p_t + v_t \delta t + \frac{1}{2} a_t \delta t^2$ where a is the acceleration, v is the velocity, p is the position, t is the time, and δt is the time period.

This method assumes acceleration is constant over the time period, and inaccurate results are obtained when the time period is large or accelerations are changing rapidly. More sophisticated methods may be found in a number of numerical integration methods (Press W H et al, "Numerical Recipes", Cambridge Univ. Press, Cambridge, England (1986)).

Figure 7A:
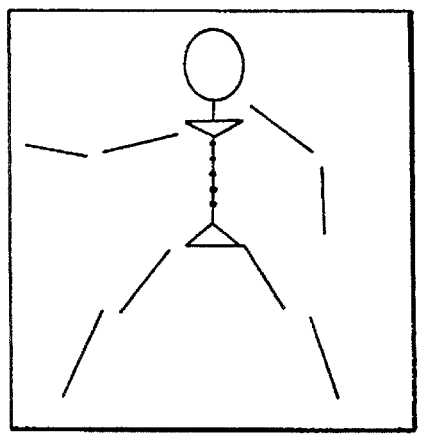
FIGS. 7(a) and 7(b) are views showing the results of the step of checking and enforcing constraints, FIG. 7(a) being before the application of constraints and FIG. 7(b) being thereafter.
Figure 7B:
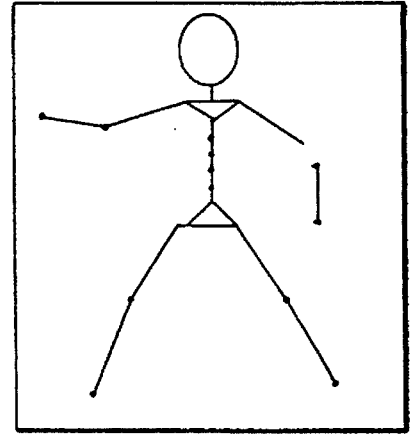

In the ninth step (application of constraints), the articulation of the segment of the robot or of the machine elements and the range of the movements of the joints connecting the segments or elements are checked for each of the motions calculated in the eighth step (FIGS. 7(a) and 7(b)). The process of applying constraints starts at a segment referred to as a root element, and the position and the orientation of each segment in a subclass of the root element are checked sequentially. Here, two types of checks are performed. One is a check whether a subclass element is always connected to its superclass element. The other is a check whether the movement of each joint exceeds a specified range. If the subclass element is not connected to its superclass element, the subclass element is translated until it becomes connected to its superclass element. If the movement of any joint exceeds the specified range, the movement of the joint is adjusted to be within the range by rotation of the corresponding element.

In the tenth step (application of inverse dynamics), Lagrange equations which describe the relationship between forces and movement are used to calculate the forces exerted on each joint of the robot body or connecting the machine elements. Inverse dynamics uses Lagrange's equations which describe the relationship between forces and movements to calculate the forces exerted on each joint of the body (FIG. 5). The Sun paper (supra) proposes a linear recursive algorithm to perform inverse dynamics, with the computational complexity O(n) where n is the number of the body segments.

Note the fact that inverse dynamics can provide a reasonable and integrated set of forces for dynamics to produce the motions which are adjusted due to the constraints. Without inverse dynamics, it is impossible to expect the user to be able to find out an integrated force specification. In the method of the present invention, the orientation of each body segment is changed when the related joint limit is exceeded, and the position of each body segment is adjusted to the physical constraints of the body.

If the desired results are not first obtained, the seventh to eleventh steps can be repeated, and the new motions can be developed in a interactive manner.

In the eleventh step (displaying the result), as to the relation between movements and forces obtained from calculating utilizing dynamics, the center of gravity of each of the body segments, the force and torque exerted on each joint, the center of gravity of the whole body, and the force and torque exerted on the center of gravity of the whole body, are displayed as symbols such as an arrow, superimposed over the human body model, as shown in FIG. 4, or over the human body displayed on a screen, in same manner as in the fifth step (displaying the result).

As a matter of course, the result of the calculated movements which have been analyzed using inverse dynamics can also be stored in the database to be used in the design of additional complicated motions.

It can thus be seen that the present invention provides a dynamic analysis based human motion animation using an articulated human body model. The method consists of two stages: analyzing the basic movements of an actual human being and using the analytic results to produce the new motions dynamically. The processes of dynamical simulation proceed in three steps: dynamics, constraints and inverse dynamics. The dynamics step distinguishes the articulated body into independent rigid segments (such as 50 rigid segments) and the motion of each segment is calculated independently of the motions of other segments by using the Newton-Euler equations. The idea is to reduce the number of degrees of freedom and thus the amount of computation required, and to avoid the complexity of dealing with continuum mechanics. In the constraint step, the articulation of the body and the range of movements of the body joints are checked and maintained. A segment which violates its constraints is moved by translations and rotations so that it becomes connected to its super-segment or is bent into a natural posture. In the inverse dynamics step, the forces that produced the new motions, which have been modified due to the constraints, are calculated. The total computational complexity is O(n), where n is the number of the body segments. The user interacts with the system by specifying the control forces and getting the motions produced by the dynamics and the constraints, the forces being modified due to the constraints. The present method solves the computational problem that existed in dynamics and enables dynamics to produce real time feedback so that dynamics are now made well suited to computer animation work.

Those of ordinary skill in the art will understand that this animation system may be integrated with an object-oriented paradigm for the direct manipulation of the robot or machine tool to be controlled. The robot or machine tool may thus be programmed or the numerical control program formed directly from the computer animation which has been created for the desired motion, in a manner well known to those of ordinary skill in the art.

All references cited herein, including journal articles or abstracts, published or corresponding U.S. or foreign patent applications, issued U.S. or foreign patents, or any other references, are entirely incorporated by reference herein, including all data, tables, figures, and text presented in the cited references. Additionally, the entire contents of the references cited within the-references cited herein are also entirely incorporated by reference.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

What is claimed is:

1. A robot programming method using a computer, comprising the steps of:

maintaining, in a database, data for modeling a human or animal body, which body has been divided into a plurality of segments, each of said segments connected by joints and each of said segments acting as a minimal unit of motion, said data relating to an inherent nature of each of said segments and physical constraints including inter-relationship of each segment and range of movements of said joints;

observing actual movements of a human or animal body, including a position of each said segment at predetermined intervals in the course of such actual movement;

analyzing the data as to the position of each said segment as observed during actual movements and calculating by inverse dynamics centers of gravity of each said segments and of the whole human or animal body, force and torque exerted on each said center of gravity and force and torque exerted on each said joint;

inputting the calculated results from said calculating step into said database;

determining a new motion to be designed;

calculating by dynamics, and neglecting physical constraints, motion of each body segment, independently of the remaining body segments, based on forces corresponding to the new motion selected in said determining step using the data maintained in said database for previously analyzed motions and dynamic equations governing movement of each segment;

applying said physical constraints as stored in said database to check that each segment is articulated to the adjacent segment and that the movement of each joint does not exceed the range specified by said physical constraints, and adjusting the position of each segment until each of said physical constraints are met; and displaying on a screen the motion of the robot as designed by said steps of calculating by dynamics and applying physical constraints.

2. A method in accordance with claim 1, further including the steps of, after said step of applying physical constraints and before said displaying step:

applying inverse dynamics to calculate forces on each joint as adjusted in said step of applying physical constraints to thereby provide a reasonable and integrated set of forces for dynamics to produce the motions which have been adjusted due to the physical constraints; and inputting the results of said step of applying inverse dynamics into said database.

3. A method in accordance with claim 1, wherein said display step further includes displaying one or more of the center of gravity of each of said body segment, the force and torque exerted on each joint, the center of gravity of the whole body and the force and torque exerted on the center of gravity of the whole body.

4. A method in accordance with claim 3, wherein said centers of gravity, forces and/or torques are displayed as symbols superimposed over a display body model.

5. A method in accordance with claim 1, further including the step of integrating the animation displayed in said displaying step with an object oriented paradigm for a direct manipulation of the robot.

6. A numerical control technique for machine tool programming using a computer, comprising the steps of:

maintaining, in a database, data for modeling the body of a human machine tool operator, which body has been divided into a plurality of segments, each of said segments connected by joints and each of said segments acting as a minimal unit of motion, said data relating to an inherent nature of each of said segments and physical constraints including inter-relationship of each segment and range of movements of said joints;

observing actual movements of a human body, including a position of each said segment at predetermined intervals in the course of such actual movement;

analyzing the data as to the position of each said segment as observed during actual movements and calculating by inverse dynamics centers of gravity of each of said segments and of the whole human body, force and torque exerted on each said center of gravity and force and torque exerted on each said joint;

inputting the calculated results from said calculating step into said database;

determining a new motion to be designed;

calculating by dynamics, and neglecting physical constraints, motion of each body segment, independently of the remaining body segments, based on forces corresponding to the new motion selected in said determining step using the data maintained is said database for previously analyzed motions and dynamic equations governing movement of each segment;

applying said physical constraints as stored in said database to check that each segment is articulated to the adjacent segment and that the movement of each joint does not exceed the range specified by said physical constraints, and adjusting the position of each segment until each of said physical constraints are met; and displaying on a screen the motion of the machine tool operator as designed by said steps of calculating by dynamics and applying physical constraints.

7. A method in accordance with claim 6, further including the steps of, after said step of applying physical constraints and before said displaying step:

applying inverse dynamics to calculate the force on each joint as adjusted in said step of applying physical constraints to thereby provide a reasonable and integrated set of forces for dynamics to produce the motions which have been adjusted due to the physical constraints; and inputting the results of said step of applying inverse dynamics into said database.

8. A method in accordance with claim 6, wherein said display step further includes displaying one or more of the center of gravity of each of said body segment, the force and torque exerted on each joint, the center of gravity of the whole body and the force and torque exerted on the center of gravity of the whole body.

9. A method in accordance with claim 8, wherein said centers of gravity, forces and/or torques are displayed as symbols superimposed over a display body model.

10. A method in accordance with claim 6, further including the step of integrating the animation displayed in said displaying step with a numerical control program for causing a machine tool to be operated in the manner displayed for the animated machine tool operator.

* * * * *